United States Patent [19]
Cox

[11] 3,725,781
[45] Apr. 3, 1973

[54] PHASE METER WITH NOISE ERROR REDUCTION MEANS

[75] Inventor: Philip P. Cox, Piscataway, N.J.

[73] Assignee: Dranetz Engineering Laboratories Inc., Plainfield, N.J.

[22] Filed: Mar. 17, 1971

[21] Appl. No.: 125,123

[52] U.S. Cl. ............................................. 324/83 A
[51] Int. Cl. ............................................. G01r 25/00
[58] Field of Search ............ 324/83 A, 83 D; 328/133

[56] References Cited

UNITED STATES PATENTS 3,079,522   2/1963   McGarrell ........................ 324/83 A
3,096,480   7/1963   Pihl ................................... 324/83 A
3,502,854   3/1970   Harris et al. ..................... 324/83 A Primary Examiner—Alfred E. Smith
Attorney—Samuelson & Jacob

[57] ABSTRACT

A phase meter for measuring the phase angle between two alternating current signal waveforms having means for the presentation of the phase difference in either analog or digital form. Means are provided for reducing errors due to noise and waveform distortion and eliminating the 0° – 360° ambiguity.

14 Claims, 7 Drawing Figures

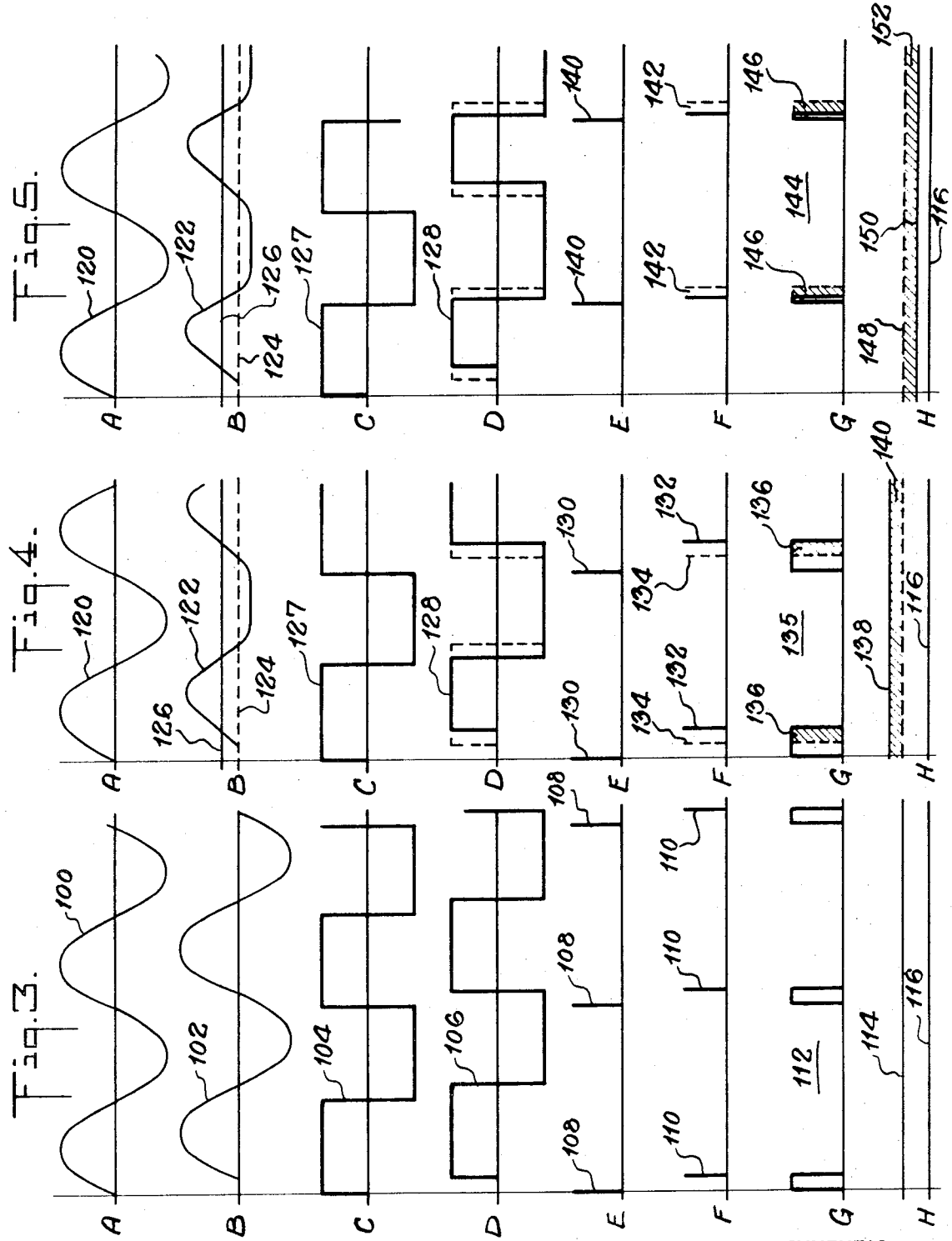

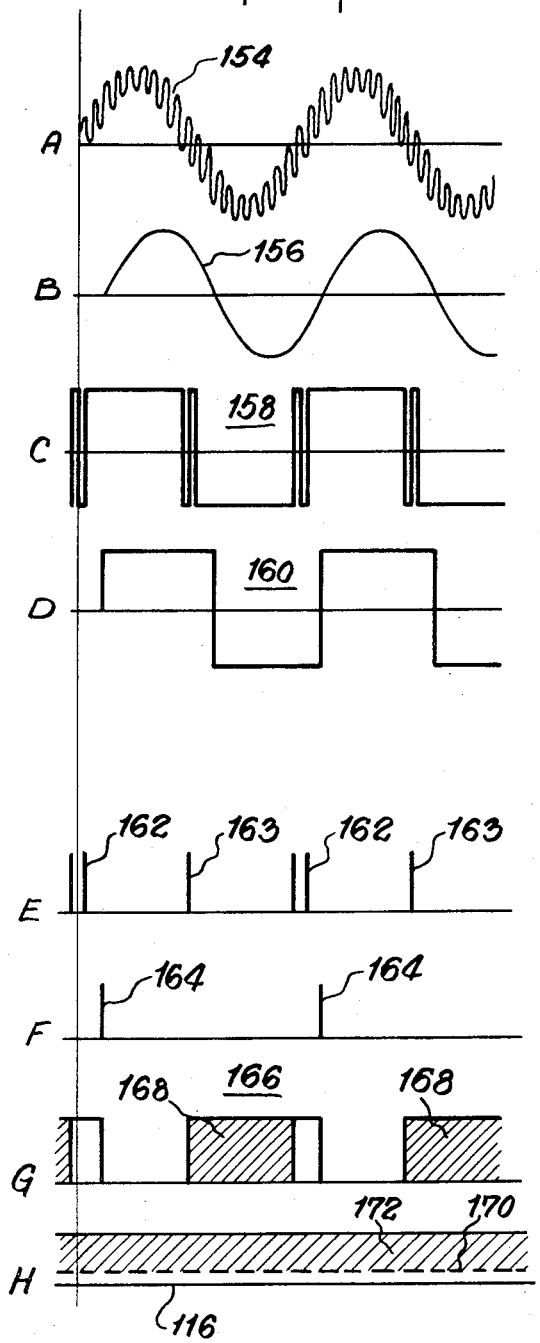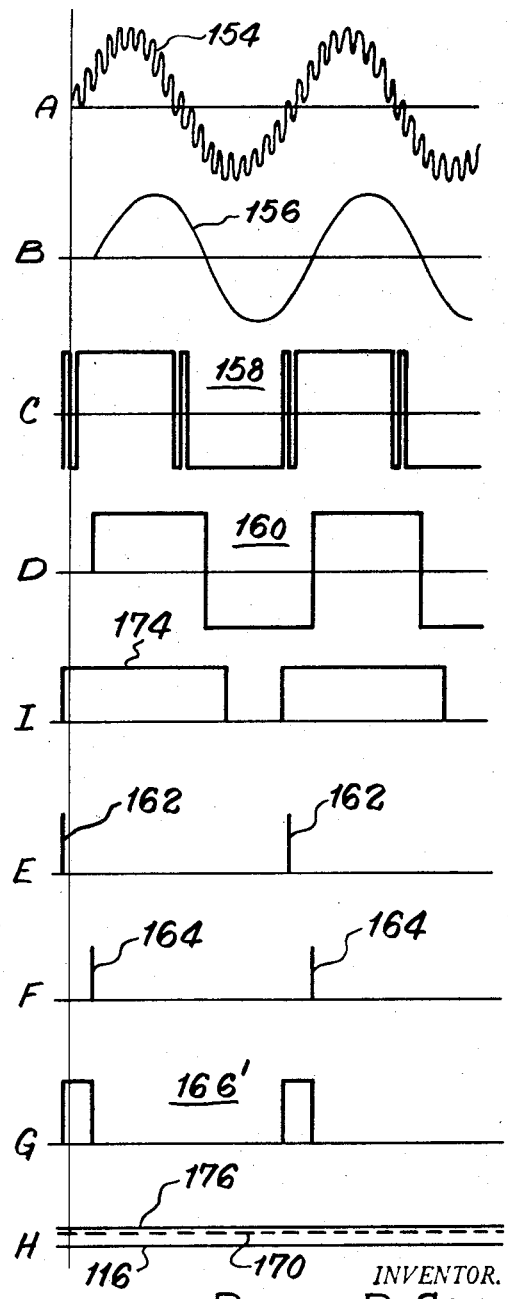

PHASE METER WITH NOISE ERROR REDUCTION MEANS

The invention relates to phase meters and in particular to those phase meters which may be used to measure the phase difference between two alternating current signals and which reduce the errors which are usually present due to waveform distortion and/or noise.

Prior art phase meters are of either the 180° or 360° types. Both of these types possess some inherent errors which cannot be removed from the output display. The 360° type cannot remove the ambiguity which occurs at the 0° – 360° point. In the 180° type it is not possible to determine directly the quadrant of the phase angle. In addition, both types produce errors due to waveform distortion and the 360° type also produces errors due to noise.

Broadly, the present invention has as an important object the providing of a phase meter which eliminates these deficiencies in the prior art devices and comprises two systems. One of the systems operates on one of the signals and the other operates on the other signal. Pulses are produced in both systems and they are compared to produce an output which is a direct function of the difference in phase between the original signals. Preferably, this is accomplished by generating a waveform whose duty cycle is proportional to the phase difference. These generated waves are averaged and summed to produce an analog output which is proportional to the phase difference. An analog-to-digital converter may also be used to produce a digital signal which is proportional to the phase difference. Alternatively, digital means may be used to determine the time differences between pulses and to compute the phase angle therefrom.

Means are also provided for reducing errors due to waveform distortion and noise. The analog output may be displayed on an oscilloscope, a voltmeter, a strip chart recorder or an x-y recorder.

It is a further object of the invention to provide such a phase meter which will adjust the time constant of the combined summing and averaging circuit so that its speed is a function of the frequency of the signal being measured.

It is a still further object of the invention to include in a 360° phase meter a 180° control circuit to eliminate the 0° – 360° ambiguity.

It is also an object of the invention to provide such a phase meter whose input gain is controlled to avoid the errors normally introduced by greatly divergent input levels.

These and other objects, advantages, features and uses will be apparent during the course of the following description, when taken in connection with the accompanying drawings, wherein:

FIG. 3 is a series of timing diagrams showing the operation of the phase meter of the invention on two waves which are free of both noise and waveform distortion;

FIG. 4 is a view similar to that of FIG. 3 showing the error which is inherent in the measurement of phase difference when one of the signals possesses a distorted waveform;

FIG. 5 is a view similar to that of FIG. 3 showing the corrections generated in the phase meter of the invention to correct for waveform distortion;

FIG. 6 is a view similar to that of FIG. 3 showing the error introduced in the measurement of phase difference when there is noise present in the signal being measured; and FIG. 7 is a view similar to that of FIG. 3 showing the corrections generated in the phase meter of the invention to correct for the errors due to noise.

Figure 1:
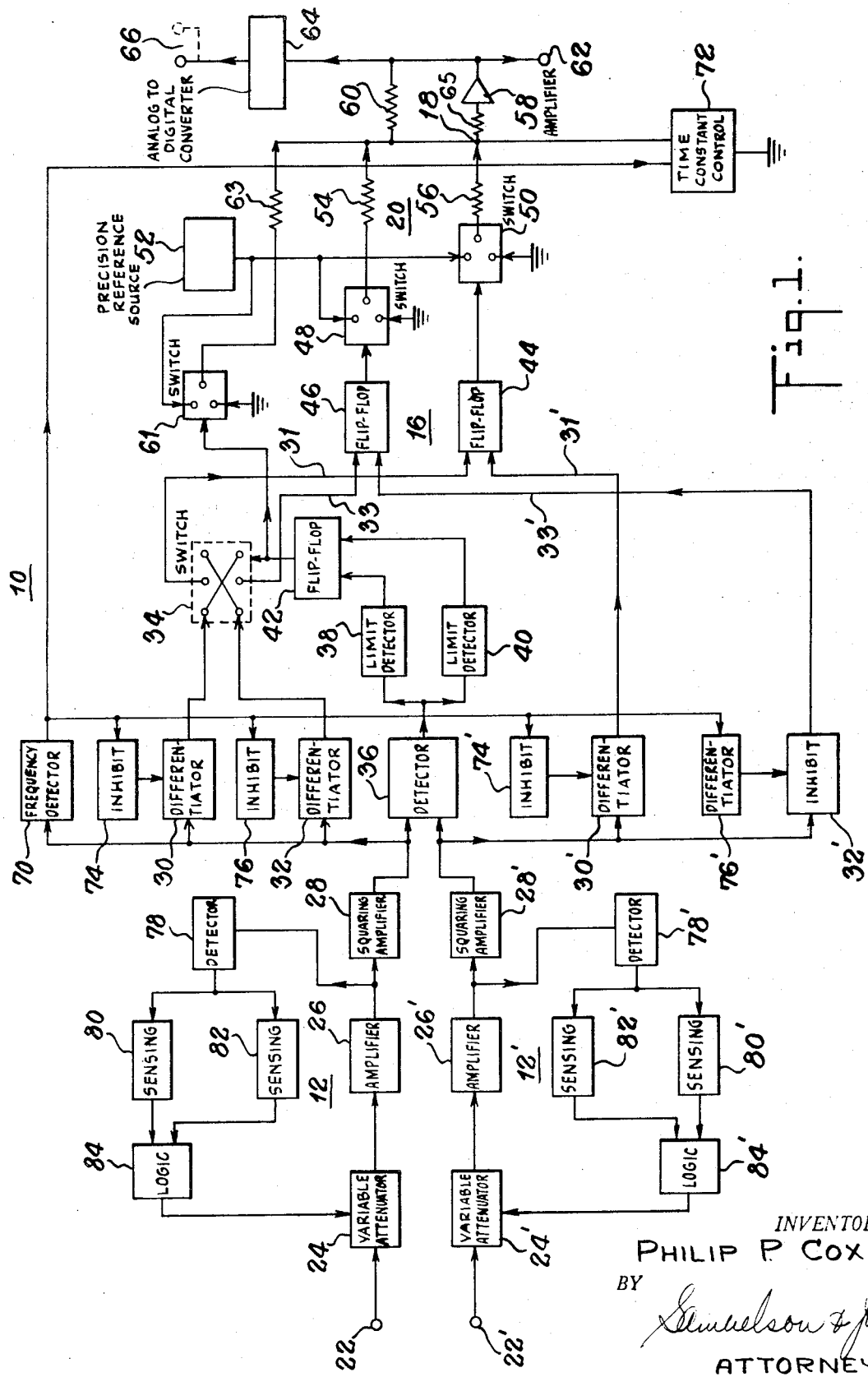
FIG. 1 is a block diagram of a preferred form of phase meter of the invention.

In the drawings, wherein, for the purpose of illustration, there are shown preferred embodiments of the invention, the numeral 10 designates a phase meter of the invention.

Phase meter 10 is seen to comprise (FIG. 1) a pair of systems 12 and 12', one for each of the alternating current signals to be compared, wave generating means 16, and combined averaging and summing means 20. Since systems 12 and 12' are identical in structure, one of them will be described. However, it is to be understood that the system elements are the same in both systems. An alternating current signal is applied to input terminal 22 and then to variable attenuator 24 which is adjusted in a manner which will be described later so that the amplitude of the signal applied to the system is within proper limits. The output of attenuator 24 is fed to amplifier 26 whose output waveform is the same as that at its input. The output of amplifier 26 is fed to squaring amplifier 28 which produces a square wave from the original alternating current signal. The squaring amplifier may be, for example, an overdriven amplifier. The output of amplifier 28 is fed to differentiators 30 and 32. Differentiator 30 produces, for example, a positive pulse at the time of the positive-going transition of the square wave and differentiator 32 produces a positive pulse at the negative-going transition of the square wave.

The purpose of the differentiators 32 and 32' in combination with differentiators 30 and 30' is to correct for the errors which are due to waveform distortions in the original signals. The outputs of differentiators 30 and 32 are fed to solid state double pole - double throw switch 34 which is shown in schematic form and whose function will be described shortly. The center terminals of switch 34 connect to one or the other set of end terminals. The outputs of squaring amplifiers 28 and 28' are also fed to phase magnitude detector 36 which produces an output voltage which is proportional to the difference in phase between the two square waves. The signal from detector 36 is fed to two limit detectors 38 and 40; one senses the high limit close to 180°, say, for example 165°, and the other senses the low limit close to 0°, say, for example 15°. The outputs of the limit detectors are fed to a solid state flip-flop circuit 42 whose output controls the position of the switch 34.

In one position of solid state switch 34, the pulse from differentiator 30 is applied to line 31 and to a flip-flop 44 and in the other position, it is applied to line 33 and to a flip-flop 46. When the switch is in the first position, the output of differentiator 32 is applied to line 33 and in the second position, it is applied to line 31. This selection system, from detector 36 through flip-flop 42, acting on switch 34 eliminates the error due to the 0° – 360° ambiguity which is caused when the two input signals at 22 and 22' are almost in phase.

The nature of the 0° – 360° ambiguity and the manner in which the ambiguity is avoided may be described as follows. When the phase angle between the signals at terminals 22 and 22' becomes small, pulses from differentiators 30 and 30' approach simultaneity. If they actually become simultaneous, the output state of flip-flip 44 becomes undefined. In actual practice, even a small amount of noise from various sources causes the flip-flip to change state in a random fashion which no longer directly relates to the phase angle being measured when the input pulses are nearly simultaneous. The same conditions exist with the pulses from differentiators 32 and 32' which actuate flip-flop 46.

It should be noted that pulse outputs from differentiators 32 and 32' are normally 180° out of phase with those from differentiators 30 and 30'.

If the angles become small, it is possible therefore to use the outputs of 30 and 32' to drive flip-flop 46 while using 32 and 30' to drive flip-flop 44. The flip-flops will then be driven by pulses with adequate time separation.

The only difference in operation caused by this exchange of pulses will be an offset of 180° in the output signal at output terminal 62. This can be corrected by having flip-flop 42 also actuate switch 61 which will add a current to summing point 18 exactly equivalent in magnitude, but opposite in polarity to the 180° offset introduced by the pulse exchange. The output at terminal 62 will then be correct for either position of switch 34.

The signal is next applied to comparison means 16, preferably shown as wave generating means. If desired, the pulses so available may be fed to a digital system which measures time differences between pulses and computes the phase angle.

In the first position of switch 34, the signals from differentiators 30 and 30' are compared in solid state flip-flop 44 and those from differentiators 32 and 32' are compared in solid state flip-flop 46. Flip-flops 44 and 46 are of the set-reset type in that the set input signal sets the output level to the high output position and the reset input signal sets the output level back to zero. Thus the duty cycle of the square wave appearing at the output of the flip-flop 44 or 46 is proportional to the difference in phase between the input signals at terminals 22 and 22'.

The output of flip-flop 44 is applied to a drive terminal of a solid state switch 50 and the output of flip-flop 46 is applied to a drive terminal of solid state switch 48. The first input to each switch is a direct current voltage from a precision reference source 52 and the second input is ground. During each cycle of the input signal, the output terminal of each switch is alternately connected to the reference direct current voltage or to ground depending upon the state of the drive input. In this way the switch output levels are regulated to the precise values to be fed to the summing and averaging means 20 which comprises resistors 54, 56, 60, 63, 65, amplifier 58 and time constant control 72.

The output of amplifier 58 appears as an analog voltage proportional to the phase difference at terminal 62. The output of amplifier 58 may also be fed to analog-to-digital converter 64 at whose output terminals 66, a digital readout proportional to the phase difference is obtained.

The output of the squaring amplifier from one of the systems only, say, amplifier 28, is also fed to frequency detector 70 which applies a signal which is a function of the frequency of the original signal to an automated, time constant section 72 which is, for example, a capacitor which adjusts the time constant of the averaging circuit so that the time for accomplishing the averaging of the pulse generated signal is necessary and sufficient.

The output of frequency detector 70 is also used to supply excitation to inhibit circuits 74, 74', 76 and 76'. These inhibit circuits are, preferably, a semiconductor latching device with a delayed release; the release time of which is determined by the input from frequency detector 70. The inhibit circuits are used to eliminate the errors due to noise by keeping false signals from being applied to the flip-flops 44 and 46. This will become evident during the discussion of the timing diagrams which appears later in this specification.

To control the amplitude of the signal applied to amplifier 26, a servo system is provided. It comprises a detector 78 whose input is connected to the output of amplifier 26. The output of detector 78 is connected to sensing devices 80 and 82, one for the high limit and the other for the low limit. The output of the sensing devices is connected to logic 84 whose output is used to adjust the position of the attenuator 24.

Figure 2:
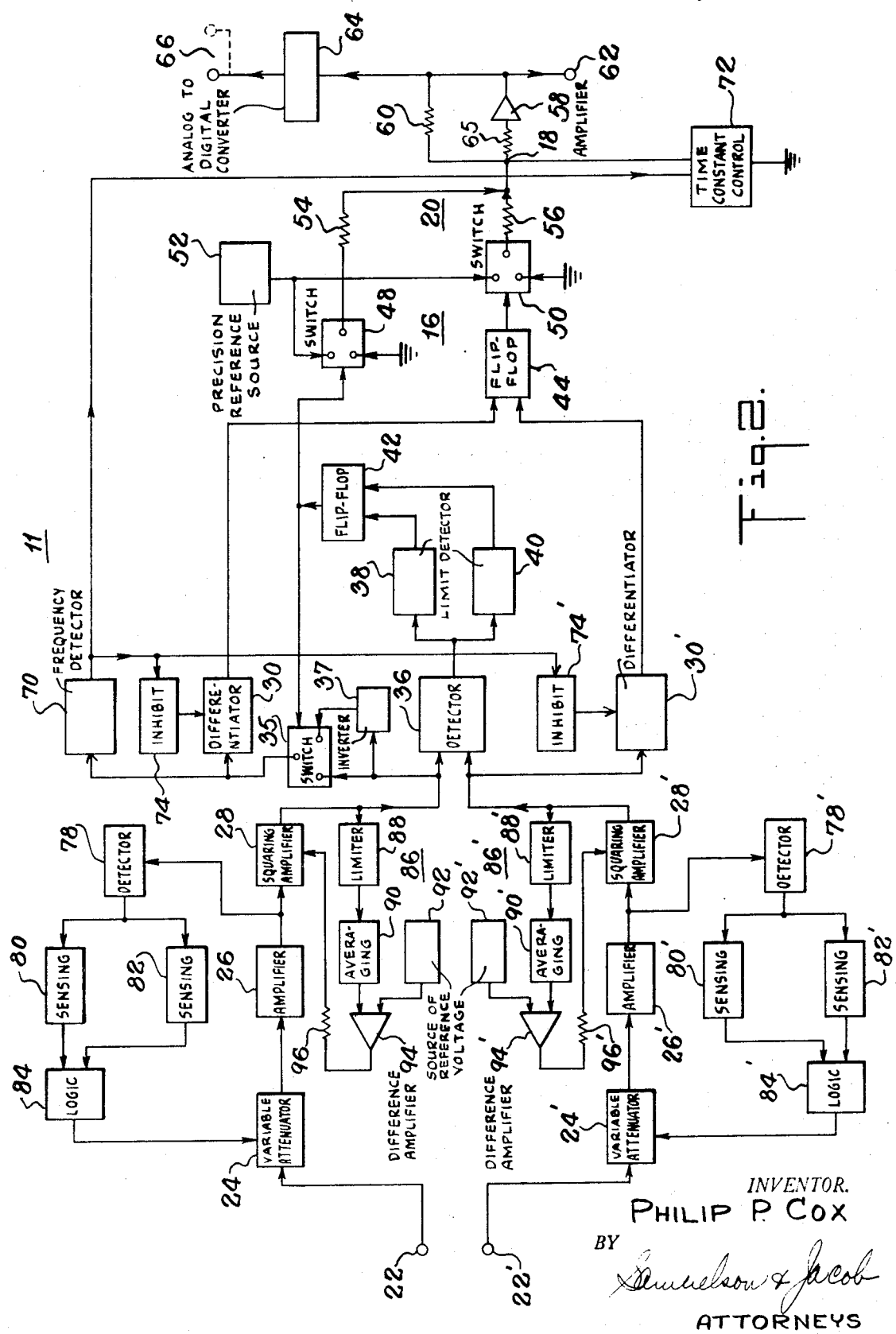
FIG. 2 is a block diagram of an alternate form of phase meter of the invention.

FIG. 2 is similar to that of FIG. 1 and illustrates phase meter 11 which uses an alternate construction for correcting for waveform distortion. Differentiators 32 and 32' and all the other elements necessary to their use in the phase meter have been eliminated. Double pole - double throw switch 34 has been replaced by a solid state, single pole - double throw switch 35 and inverter 37 which together introduce the correction to avoid the 0° – 360° ambiguity. Correction circuit 86 comprises limiter 88 which is connected to the output of squaring amplifier 28, averaging circuit 90, difference amplifier 94, source of reference voltage 92 and output resistor 96 which is connected to a bias control point of squaring amplifier 28.

The output of limiter 88 is a square wave of peak-to-peak level, say $V_c$, which is fed to averaging circuit 90 which produces a direct current signal having a value ½ $V_c$. The source of reference voltage 92 supplies a direct current signal having an amplitude of ½ $V_c$ which is fed to one of the inputs of amplifier 94 and compared with the direct current signal from averaging amplifier 90 which appears at another input of amplifier 94. The output of amplifier 94 is applied to the bias point of squaring amplifier 28 through resistor 96.

The circuits 88, 90, 92 and 94 act upon squaring amplifier 28 to force the square wave output of 28 into symmetry, that is, 50 percent duty cycle. This is the proper duty cycle for an undistorted sine wave input. When distortion causes a movement of the sine wave zero crossing points in such a way as to cause nonsymmetry in the square wave, the correction circuits shift the sine wave's bias level to cause a return to the symmetrical condition and remove the effects of such distortion on the subsequent stages of the phase meter.

To more fully understand the operation of the phase meter of the invention, it is necessary to examine the waveforms shown in FIG. 3. These waveforms illustrate the measurement of the phase difference between two alternating current signals which are free of both noise and waveform distortion. On line A, there is shown the waveform 100 of one of the alternating current signals and on line B, there is shown the waveform 102 of the other of the alternating current signals. Line C is a plot of the square wave 104 formed from the signal on line A and line D is a plot of the square wave 106 formed from the signal on line B. The pulses 108 on line E are formed at the positive-going axis crossings of the square wave 104 on line C and the pulses 110 on line F are formed at the positive-going axis crossings of the square wave 106 on line D. Line G depicts the wave generated by the wave generating means from the pulses on lines E and F and line H illustrates the average value 114 of direct current signal which is proportional to the phase difference between the two original signals. Line 116 represents the zero reference axis.

The waveform 120 of the signal on line A of FIG. 4 is free of distortion and the waveform 122 of the signal on line B possesses waveform distortion. The dashed line 124 represents the zero axis of waveform if undistorted while the solid line 126 is the new average value (equal areas above and below the axis) of the distorted waveform. The square wave 127 on line C is formed from the signal on line A and the square wave 128 on line D is formed from the signal on line B. The dashed vertical lines on line D indicate the positions at which the sine wave crosses the original axis 124 and the solid vertical lines indicate the positions at which the sine wave crosses the displaced axis 126.

The pulses 130 on line E are generated by the positive-going axis crossings of the square wave 127 on line C and the pulses 132 on line F are generated by the positive-going axis crossings of the square wave 128 on line D. The solid line is the position of the actual pulse and the dashed line 134 is where the pulse ought to be to give the correct indication of phase difference. The wave 135 on line G is that generated by the generating means and the shaded portions 136 depict the error introduced by the distortion.

In line H, the solid line 138 above the zero axis 116 depicts the actual average direct current signal obtained from the wave on line G and the shaded portion 140 indicates the error in the reading.

Lines A, B, C and D of FIG. 5 are the same as the corresponding lines of FIG. 4. The pulses 140 on line E are positive pulses formed at the negative-going axis crossings of the square wave 127 on line C and the pulses 142 on line F are formed by the negative-going axis crossings of the square wave 128 on line D. The solid line is the position of the actual pulse and the dashed line is the position at which the pulse ought to appear. The wave 144 on line G is that generated from the pulses on lines E and F and the shaded portion 146 is the error in the reading. The dashed line 148 on line H is the true value and the solid line 150 is the measured value so that the shaded portion 152 is the negative error. It can readily be seen that the errors on lines H of FIGS. 4 and 5 are equal but opposite in sign so that when these opposite errors are averaged, the output of the phase meter will be proportional to the actual difference in phase between the original alternating current signals.

In FIG. 6, there are two sine waves whose phase difference is to be measured. On line A, there is shown the waveform 154 of a sine wave which is noisy. This wave has both positive and negative going crossings of the zero axis at each single crossing of a noise free wave. The sine wave 156 on line B is free of noise. The square wave 158 on line C is formed from the wave 154 on line A and square wave 160 on line D is formed from the wave 156 on line B. A series of vertical lines is shown at each positive-going axis crossing of square wave 158 because there are multiple zero crossings of the axis due to the noise.

The pulses 162 and 163 on line E are formed at the positive-going axis crossings of the square wave 158 on line C and pulses 164 on line F are formed at the positive-going axis crossings of the square wave 160 on line D. The wave 166 shown on line G is generated by the pulses on lines E and F and the error due to extraneous pulses 163, which are caused by the noise, is depicted by the shaded portion 168. The dashed horizontal line 170 on line H is the true average value which is proportional to the phase difference between the original waves and the shaded area 172 is the error introduced in the reading by the noise.

FIG. 7 illustrates the manner in which the phase meter of the invention corrects for the error due to noise. The illustrations on lines A, B, C, D and F are the same on FIGS. 6 and 7. The wave 174 on line I is introduced by the inhibit circuit and it stays on long enough to prevent the differentiator from generating any more than one pulse per cycle of the input square wave. The differentiator is allowed to generate a single pulse and is latched and not allowed to return to its ready state for one half the cycle of the signal frequency plus a time delay which is sufficient, at the operating frequency, to not allow generation of extraneous pulses due to the illustrated noise. The pulses generated on line E are at the first positive-going zero crossing of either signal or noise and therefore may show a slight error. The wave 166' on line G is formed from the pulses on lines E and F and the average direct current voltage which is proportional to the phase difference is shown on line H. The major portion of the error caused by the extraneous pulses on FIG. 6 line E is shown to be eliminated. The error remaining is that between lines 176 and 170 on line H where the dashed line depicts the true value.

While all the examples given herein utilize positive pulses at the outputs of the differentiators, it is also within the contemplation of the invention to utilize negative pulses to carry out the teachings thereof.

While particular embodiments of the invention have been shown and described, it is obvious to those skilled in the art that changes and modifications may be made without departing from the spirit of the invention or the scope of the subjoined claims.

The embodiments of the invention in which an exclusive property or privilege is claimed are defined as follows:

1. A phase meter for measuring the phase difference between two sources of alternating current signals comprising:

a pair of systems, one for each of the alternating current signals, each such system comprising:

a. square wave producing means for producing a square wave signal from the alternating current signal;
b. pulse producing means for producing a pulse at a predetermined, axis crossing direction of the square wave signal;
c. inhibit means for limiting the output of the pulse producing means to one pulse per cycle of the alternating current signal;

comparison means for comparing the pulses produced in both said systems to produce an output which is a direct function of the difference in phase between the two alternating current signals.

2. The invention of claim 1 including:
frequency detecting means connected in one of the systems to detect the frequency of the alternating current signal;
the output of the frequency detecting means being connected to the inhibit means to control the operation thereof.

3. The invention of claim 2 wherein the comparison means comprises:
generating means for generating a wave whose duty cycle is proportional to the phase difference between the two alternating current signals.

4. The invention of claim 3 including:
level control means for maintaining accurate upper and lower limits on the square wave; and
averaging and summing means to convert the average level of the generated wave to a direct current signal.

5. The invention of claim 1 wherein at least one of the systems includes:
limiting means connected at the output of the square wave producing means for establishing an accurate square wave level;
averaging means connected to the output of the limiting means for obtaining the average value of the square wave output of the limiting means;
an amplifier having two difference inputs and an output, the output of the averaging means being connected to one of the inputs of the amplifier;
a direct current source of voltage whose magnitude is one half that of the maximum amplitude of the square wave output of the limiting means connected to the other input of the amplifier;
the output of the amplifier being connected to a bias point of the square wave producing means to adjust the bias level thereof to maintain symmetry of the output of the square wave producing means.

6. The invention of claim 1 including:
phase magnitude detecting means connected to the outputs of both square wave producing means to thereby produce a direct current signal proportional to the difference in phase between the two alternating current signals;
limit detecting means connected to the output of the phase magnitude detecting means;
switching means connected to the output of the limit detecting means for directing the pulse output of each pulse producing means to an appropriate input of the comparison means.

7. The invention of claim 4 including:
a capacitor in the summing and averaging means controlled by the frequency detecting means to thereby select the fastest time constant in the averaging means consistent with the frequency of the generated wave.

8. The invention of claim 7 including:
an analog-to-digital converter connected to the summing and averaging means to produce a digital output proportional to the difference in phase between the two alternating current signals.

9. The invention of claim 6 wherein each system includes:
a second pulse producing means for producing a pulse at the opposite zero crossing of the square wave signal from that utilized by the first pulse producing means; and wherein:
the switching means controls the pulses of the two systems which are applied to the generating means.

10. The invention of claim 3 wherein each system includes:
a second pulse producing means for producing a pulse at the opposite zero crossing of the square wave signal from that utilized by the first pulse producing means; and including:
switching means for directing the pulse output of each pulse producing means to an appropriate input of the generating means.

11. The invention of claim 2 wherein each system includes:
a second pulse producing means for producing a pulse at the opposite zero crossing of the square wave signal from that utilized by the first pulse producing means; and including:
switching means for directing the pulse output of each pulse producing means to an appropriate input of the comparison means.

12. The invention of claim 1 wherein:
a second pulse producing means for producing a pulse at the opposite zero crossing of the square wave signal from that utilized by the first pulse producing means; and including:
switching means for directing the pulse output of each pulse producing means to an appropriate input of the comparison means.

13. The invention of claim 2 including:
an amplifier connected between the source of the alternating current signal and the square wave producing means; and wherein the level control means comprises:
a detector connected to the output of the amplifier;
sensing means for sensing the high and low limit outputs of the detector;
an attenuator connected to the input of the amplifier;
a logic circuit connected to the sensing means and the attenuator to control the setting of the attenuator in accordance with the output level of the detector.

14. The invention of claim 5 including:
frequency detecting means connected in one of the systems to detect the frequency of the alternating current signal;
the output of the frequency detecting means being connected to the inhibit means to control the operation thereof.

* * * * *

UNITED STATES PATENT OFFICE
CERTIFICATE OF CORRECTION

Patent No. 3,725,781  Dated April 3, 1973

Inventor(s) Philip P. Cox

It is certified that error appears in the above-identified patent and that said Letters Patent are hereby corrected as shown below:

In the Front Page and in FIG. 1, the designation of
   block 76' should read --INHIBIT--
In the Front Page and in FIG. 1, the designation of
   block 32' should read --DIFFERENTIATOR--
Column 3, line 9, "flip-flip" should read --flip-flop--
Column 3, line 20, after "30'" insert --, respectively--
Column 3, penultimate line, delete "the"

Signed and Sealed this thirteenth Day of January 1976

[SEAL]

Attest:

RUTH C. MASON
*Attesting Officer*

C. MARSHALL DANN
*Commissioner of Patents and Trademarks*